June 17, 1958  W. J. HEACOCK, JR  2,839,618
HIGH INPUT IMPEDANCE SIGNAL-MONITORING APPARATUS
Filed Feb. 14, 1955

United States Patent Office 2,839,618
Patented June 17, 1958

2,839,618

HIGH INPUT IMPEDANCE SIGNAL-MONITORING APPARATUS

William J. Heacock, Jr., Levittown, N. Y., assignor to Hazeltine Research, Inc., Chicago, Ill., a corporation of Illinois Application February 14, 1955, Serial No. 487,851

7 Claims. (Cl. 179—171)

This invention relates to signal-monitoring apparatus and, particularly, to such apparatus for monitoring or measuring electrical signals with a minimum of loading on the signal source.

It is frequently desirable to monitor or measure the electrical signal occurring at some point in an electrical circuit without appreciably disturbing the operation of the circuit. Such a situation arises, for example, where it is desired to measure an unknown voltage by means of a vacuum-tube voltmeter. Any disturbance in the circuit being tested which is caused by the presence of the vacuum-tube voltmeter would, of course, obscure the significance of the meter readings. Another situation where it is desirable to monitor electrical signals with a minimum of loading on the signal source occurs in certain types of servo systems and automatic tracking operations where the circuit whose output signal is used to control some accompanying operation is sensitive to the presence of circuits coupled thereto.

The problem in monitoring electrical signals with a minimum of loading or disturbance on the signal source is to maintain the effective input impedance of the monitoring apparatus at a relatively high value compared to the impedance of the signal source. Circuits such as conventional cathode-follower circuits employing conventional electron tubes have heretofore been proposed for performing the desired monitoring function. These circuits, however, are unsatisfactory for monitoring relatively large signal variations because the effective input impedance of such circuits varies considerably with the magnitude of the input signal variations. Other high-impedance circuit configurations have been proposed but these result in substantial attenuation of the signal being monitored as a result of translation through such monitoring apparatus. Special electron tubes have also been proposed for monitoring purposes but these are relatively expensive and replacements are not always as readily available as may be desired.

It is an object of the invention, therefore, to provide new and improved signal-monitoring apparatus capable of translating a signal being monitored with very little attenuation thereof and without causing any substantial loading on the signal source.

It is another object of the invention to provide new and improved signal-monitoring apparatus using conventional electron-discharge tubes and without causing any substantial loading on the signal source.

In accordance with the invention, apparatus for monitoring electrical signals with a minimum of loading on the signal source comprises a first stage including an electron-discharge device having an anode, a control electrode, and a cathode, the control electrode constituting an input terminal for coupling to the signal source, and the stage including a load impedance and means for supplying an operating potential, the impedance and operating potential being of such value to cause the electron-discharge device to operate with a minimum of control-electrode current to enable the stage to translate the input signals with a minimum of loading on the signal source. The apparatus also includes a second stage for further translating the input signals. Additionally, the apparatus includes circuit means coupled from the second to the first stage for maintaining the minimized control-electrode current regardless of the magnitude of the input signal being monitored.

For a better understanding of the present invention, together with other and further objects thereof, reference is had to the following description taken in connection with the accompanying drawing, and its scope will be pointed out in the appended claims.

Referring to the drawing.

Figure 1:
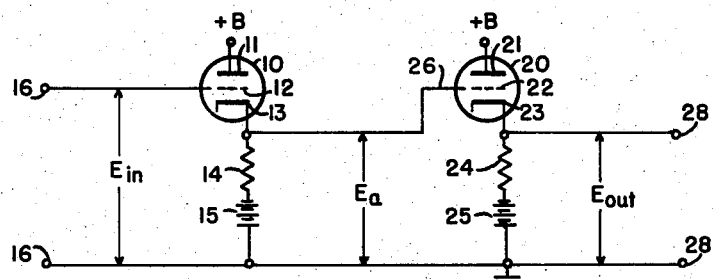
Fig. 1 is a circuit diagram of conventional cathode-follower apparatus including a pair of cathode-follower stages coupled in cascade.

Description and operation of cathode-follower apparatus of Fig. 1

Referring to Fig. 1 of the drawing, there is represented conventional cathode-follower apparatus comprising a pair of cathode-follower stages coupled in cascade. The first stage includes an electron tube 10 having an anode 11, a control electrode 12, and a cathode 13, the anode thereof being connected to a source of fixed operating potential +B, the cathode 13 thereof being coupled through a cathode load impedance 14 and a battery 15 to a point of fixed reference potential. The input signal $E_{in}$ is supplied to the first stage of the apparatus by way of a pair of input terminals 16, 16.

The second cathode-follower stage is substantially identical in construction to the first cathode-follower stage and includes an electron tube 20 having an anode 21, a control electrode 22, and a cathode 23, the anode thereof being connected to a source of fixed operating potential +B and the cathode thereof being coupled through a cathode load impedance 24 and a battery 25 to a source of fixed reference potential. The control electrode 22 of tube 20 is connected by way of a direct-current path, represented by conductor 26, to the cathode 13 of the first cathode-follower tube 10 for supplying the output signal $E_a$ of the first cathode-follower stage to the second stage. The output signal $E_{out}$ developed across the load impedance 24 of the second stage is coupled to a pair of output terminals 28, 28 for supplying the output signal to a desired utilization device.

In accordance with conventional cathode-follower operation, the output signal $E_a$ of the first stage is very nearly equal to the input signal $E_{in}$ supplied thereto. $E_a$ is slightly less than $E_{in}$ due to a small voltage drop which occurs between the control electrode 12 and the cathode 13. For practical circuits, $E_a$ may be equal to approximately 98 or 99 percent of the magnitude of $E_{in}$. Similarly, the voltage $E_{out}$ of the second stage is very nearly equal to the input $E_a$ supplied thereto. In this manner, the apparatus of Fig. 1 translates signals supplied to the input terminals 16, 16 thereof to the output terminals 28, 28 thereof with only a slight amount of attenuation.

The apparatus of Fig. 1 is not suitable for monitoring electrical signals having relatively large amplitude variations where the signal source is sensitive to the input impedance of the monitoring apparatus. This is because amplitude variations in the input signals cause corresponding variations in the difference of potential between the control electrode 12 and the cathode 13, causing variations in the control-electrode current flow which may be quite substantial where the amplitude of the input signal undergoes an appreciable excursion in the positive direction. Variations in the control-electrode current flow of tube 10 cause corresponding variations in the effective input impedance of the first stage and, hence, tend to produce a substantial disturbance on the source of signals being monitored.

Figure 2:
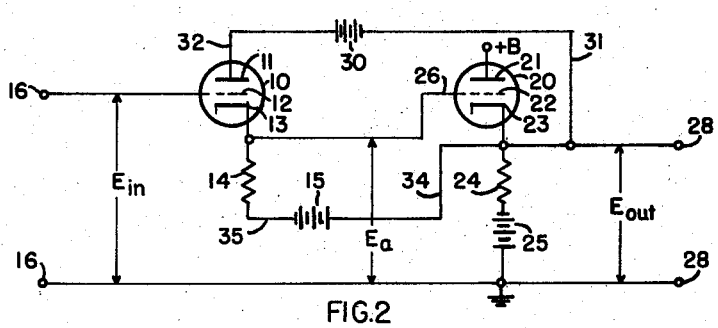
Fig. 2 is a circuit diagram of signal-monitoring apparatus constructed in accordance with the present invention.

*Description of signal-monitoring apparatus of Fig. 2*

Referring now to Fig. 2 of the drawing, there is represented signal-monitoring apparatus constructed in accordance with the present invention and comprising a first stage, for example, a cathode-follower stage including an electron-discharge device 10 having an anode 11, a control electrode 12, and a cathode 13, the control electrode 12 constituting an input terminal for coupling to the signal source, and the stage including circuit parameters of such value to cause the electron-discharge device 10 to operate with a minimum of control-electrode current to enable the stage to translate the input signals $E_{in}$ with a minimum of loading on the signal source. The first stage also includes an energy-supply circuit coupled between the anode 11 and the cathode 13 of the first electron-discharge device or tube 10 and including a load impedance, for example, a resistor 14 coupled to the cathode 13 thereof and a source of unidirectional operating potential represented, for example, by the batteries 15 and 30.

The signal-monitoring apparatus also includes a second stage, for example, a second cathode-follower stage for further translating the input signals $E_{in}$. The second stage includes a second electron-discharge device 20 having an anode 21, a control electrode 22, and a cathode 23, the control electrode 22 being coupled to, for example, the cathode 13 of the first electron-discharge device 10 for enabling the second electron-discharge device 20 to further translate the signal being monitored. The second stage also includes an energy-supply circuit coupled between the anode 21 and the cathode 23 of the second electron-discharge device 20 and including a load impedance, for example, a resistor 24 coupled, for example, to the cathode thereof and a source of unidirectional operating potential represented, for example, by the anode potential +B and the battery 25.

The signal-monitoring apparatus further includes a first signal path coupled, for example, from the cathode 23 of the second electron-discharge device 20 to the anode 11 of the first electron-discharge device 10 for minimizing anode-to-cathode potential variations within the first electron-discharge device 10. This signal path may include, for example, a conductor 31, the battery 30, and a conductor 32.

The signal-monitoring apparatus also includes a second signal path coupled, for example, from the load impedance 24 associated with the second electron-discharge device 20 to the cathode 13 of the first electron-discharge device 10 for minimizing anode-to-cathode current flow variations within the first electron-discharge device 10. This second signal path may include, for example, a conductor 34, the battery 15, a conductor 35, and the load impedance 14 associated with the first electron-discharge device 10.

The signal-monitoring apparatus additionally includes output terminals 28, 28 coupled to the load impedance 24 associated with the second electron-discharge device 20 for supplying the signal being monitored to a utilization device.

*Operation of signal-monitoring apparatus of Fig. 2*

Considering the operation of the signal-monitoring apparatus just described, the control-electrode current flow of the first or input stage of the apparatus determines the effective input impedance of the stage and, hence, the amount of loading which is placed across the signal source supplying the signal $E_{in}$ which is to be monitored. Consider now the factors which effect control-electrode current flow in a conventional electron tube. The first of these factors is the anode-to-cathode current flow within the tube. Large anode-to-cathode currents cause frequent collisions between the electrons in the current stream and the air molecules which were not removed when the tube was evacuated and the getter flashed. The positive ions thus formed are attracted to the negative control grid giving rise to control-electrode current flow. This phenomenon occurs in conventional electron tubes when the anode-to-cathode current is in the order of 50–100 microamperes or greater.

A second factor which effects control-electrode current flow is the anode-to-cathode potential difference within the electron tube. The greater the potential difference, the greater the acceleration of the current electrons and, hence, the greater the probability of air molecules being ionized. This phenomenon does not occur to any appreciable degree for moderate anode-to-cathode potential differences of the order of 200 volts or less.

A third factor which effects control-electrode current flow is the potential difference between the control electrode and the cathode within the tube. When the control electrode-to-cathode voltage becomes less negative than about —2 volts, an appreciable number of electrons from the cathode actually strike the control electrode and flow out of the tube by way of the control-electrode terminal thereof.

Figure 3:
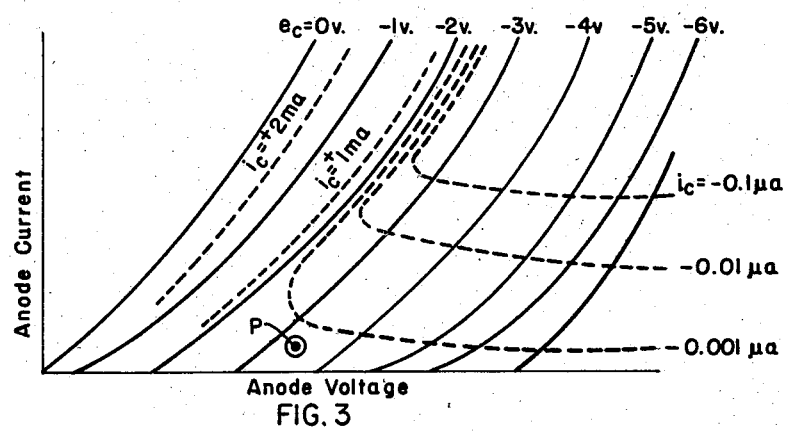
Fig. 3 is a graph representing the anode-current versus anode-voltage characteristics of a conventional three-electrode electron tube.

Fig. 3 is a graph showing the anode-voltage versus anode-current characteristics of a conventional three-electrode electron tube. The term "anode voltage" refers to the difference of potential between the anode and the cathode within the tube. Likewise, the term "anode current" refers to the anode-to-cathode current flow within the tube. The family of solid-line curves represents the relationship between anode voltage and anode current for various values of control-electrode voltage $e_c$. By "control-electrode voltage" is meant the potential difference between the control electrode and the cathode within the tube. This graph clearly shows the relationship between the three basic quantities associated with the electron tube, namely, the anode voltage, the anode current, and the control-electrode voltage. It is apparent that, if any two of these quantities are selected, the third quantity is automatically determined for a given electron tube. Also shown on the graph of Fig. 3 is a dashed-line family of curves which represents the relationship between anode voltage and anode current for different values of control-electrode current $i_c$. Thus, it will be seen that the control-electrode current flow is not actually an independent quantity but rather is dependent on the other basic quantities.

Now, in order to minimize loading of the initial stage of the apparatus on the signal source, it is necessary to select the operating point of the tube of that stage so that the control-electrode current flow is at a minimum. Such an operating point is represented by the point P shown on the Fig. 3 graph. This operating point is established by selecting the values of load impedance and operating potential of the energy-supply circuit of the first stage so that the anode voltage and current values of tube 10 correspond to this point as indicated by the Fig. 3 tube characteristic. It has been found that, by selecting the parameter and potential values so that the tube 10 of the initial stage develops an anode-to-cathode current flow of 60 microamperes, the corresponding control-electrode current flow is of the order of 0.001 microampere. This magnitude of control-electrode current is low enough so that the tube 10 does not appreciably load the signal source.

In addition to establishing an operating point at which minimum control-electrode current flows, it is necessary to maintain this operating point as nearly as possible independent of the magnitude of the signal being monitored.

In the conventional cathode follower of the apparatus of Fig. 1 no attempt is made to maintain the operating point of tube 10 of the initial stage constant. As a result, changes in the magnitude of the signal being monitored cause corresponding changes in the potential difference between the control electrode 12 and the cathode 13 of the first stage. This change in control-electrode voltage is necessary in order to secure a change in anode-current flow through the tube and to accommodate the change in anode-to-cathode voltage which results when the anode remains fixed and the cathode voltage changes. Another way of saying it is that, as the magnitude of the input signal varies, the instantaneous operating point moves back and forth on the load line (not shown) in a conventional manner. In any event, the change in control-electrode voltage causes a corresponding change in the control-electrode current flow and, hence, an objectionable amount of loading on the signal source particularly for large input signal variations.

Apparatus constructed in accordance with the present invention, as shown in Fig. 2, minimizes variations in control-electrode current of the initial tube 10 by restricting variations in the instantaneous operating point to a small area immediately adjacent to the quiescent operating point P. It would, of course, be desirable to keep the operating point fixed at point P but, as will be seen, a small change in, for example, the anode-current flow through tube 10 is necessary to produce a voltage change across load impedance 14 which is sufficient to drive the tube 20 so as to produce the desired output signal $E_{out}$. The present invention, however, holds this required anode-current change in tube 10 to a minimum.

In order to maintain the anode-to-cathode voltage within the tube 10 relatively constant, the conventional apparatus of Fig. 1 has been modified as shown in Fig. 2 so that the anode 11 of tube 10 is coupled by way of conductor 32, battery 30, and conductor 31 to the cathode 23 of the tube 20. This connection constitutes a feed-back path so that signal variations which occur across the load impedance 24 are supplied back to the anode 11 of tube 10. Because the voltage $E_a$ at the cathode 13 of tube 10 is very nearly the same as the voltage at the cathode 23 of tube 20, due to the "unity-gain" cathode-follower action of tube 20, the signal variations fed back to the anode 11 are of the same magnitude as the signal variations occurring at the cathode 13. In this manner, as the magnitude of the signal being monitored changes, the voltages at both the anode 11 and cathode 13 of tube 10 change by the same amount, which amount is very nearly the same as the voltage change occurring at the control electrode 12, so that the anode-to-cathode potential difference is maintained relatively constant. In other words, as the voltage at the control electrode 12, for example, rises in response to an increase in the signal being monitored, the voltage at both anode 11 and cathode 13 rises in a corresponding manner. This, in effect, restricts the voltage coordinate of the instantaneous operating point to the immediate neighborhood of the operating point P indicated in the Fig. 3 graph.

For relatively small input signal variations and a relatively large load impedance 14, anode-to-cathode current flow variations within the tube 10 may not be appreciable. In this case, the expedient of feeding back the signal variations to the anode 11 may be all that is necessary to maintain the operating point at a relatively fixed location and nothing further need be done to prevent undue loading on the signal source.

It is frequently necessary, however, to monitor signals undergoing relatively large amplitude variations. For this reason, the apparatus of Fig. 2 further differs from that of Fig. 1 in that the cathode 13 of the first tube 10 and the load impedance 14 and battery 15 associated therewith are coupled by way of the conductor 34 to the cathode 23 of the second tube 20. This connection establishes a second signal path for supplying signal variations developed at the cathode 23 back to the lower side of the load impedance 14. Because the signal variations supplied back in this manner are very nearly equal in magnitude to the signal variations occurring at the upper end of the load impedance 14 which is connected to the cathode 13, the voltages at both ends of the load impedance 14 vary in approximately the same manner in response to variations in the input signal $E_{in}$. This implies that very little change in current flow through the load impedance 14 and, hence, change in anode current through the tube 10 takes place.

Another way of looking at it is that the load impedance 14 is coupled directly across the control electrode 22 and the cathode 23 of the tube 20 so that a slight change in voltage thereacross is amplified by tube 20 and appears as an amplified signal variation across the load impedance 24. As both the load impedance 14 and the load impedance 24 constitute the impedance in the cathode circuit of tube 10 as seen from the input terminals 16, 16, this amplification within the tube 20 is effective to cause very nearly all of the signal variation $E_a$ to occur across the load impedance 24. In this manner, as the signal variations across the load impedance 24 are produced primarily by current flow through the tube 20, very little change in current flow is required of the tube 10. In this manner, the anode current as well as the anode voltage of the tube 10 are maintained relatively constant and, hence, the instantaneous operating point of tube 10 is restricted to a small region immediately adjacent the quiescent operating point established for a minimum of control-electrode current regardless of the magnitude of the input signal being monitored. It has been found that, where the first stage is coupled as indicated in Fig. 2, the anode-current and anode-voltage variations of tube 10 may be held to 1 or 2 microamperes and 1 or 2 volts, respectively, for an input voltage $E_{in}$ variation of 50–100 volts. The resultant dynamic input impedance of this stage is then of the order of 100,000 megohms. An input impedance of this magnitude obviously does not cause any substantial loading of the signal source by the monitoring apparatus.

In addition, because the basic cathode-follower action of each of these stages is preserved, the output signal $E_{out}$ at the output terminals 28, 28 is very nearly of the same magnitude as the input signal $E_{in}$ so that no substantial attenuation of the signal has occurred. Also there is no danger of the apparatus going into self-oscillation because the gain factors of the signal paths from the second to the first stage can never be greater than unity at any frequency.

Batteries 15 and 25, as shown in both Figs. 1 and 2, have been included in order that the voltage level at the output terminals 28, 28, in the absence of any input signal to the apparatus, may be established at 0 volt. This is purely a matter of convenience for certain applications and, hence, batteries 15 and 25 may be omitted where this convenience is not required.

Signal-monitoring apparatus as just described may be utilized, for example, as the input stage of a vacuum-tube voltmeter in which case the input terminals 16, 16 may be coupled to the voltage to be measured while the output terminals 28, 28 are coupled in the conventional amplifying and metering circuits of such a voltmeter.

Figure 4:
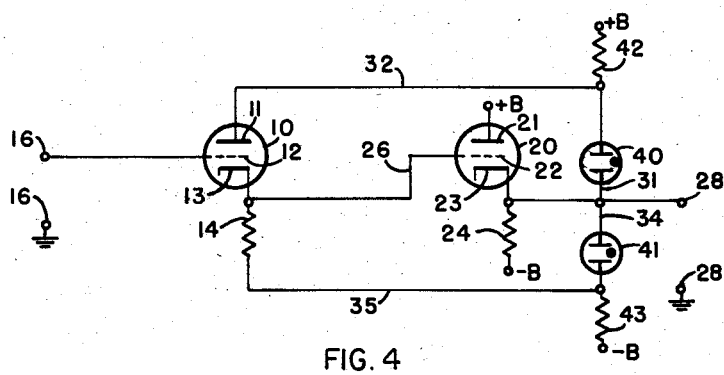
Fig. 4 is a circuit diagram of a modified form of signal-monitoring apparatus constructed in accordance with the present invention.

*Description and operation of Fig. 4 embodiment*

Referring now to Fig. 4 of the drawing, there is represented a modified form of the invention which has been found convenient for supplying the operating potentials to the first stage of the apparatus. The apparatus of Fig. 4 is identical to that of Fig. 2 except that the batteries 30 and 15 for supplying operating potential to the first stage have been replaced by corresponding neon glow lamps 40 and 41, the desired voltage drops across which are maintained by means of current flow through the associated resistors 42 and 43 which, in turn, are coupled to suitable supply-circuit terminals indicated by +B and —B. The neon glow lamps 40 and 41 serve as voltage regulator tubes in a conventional manner, hence, supplying the proper unidirectional operating potentials to the first stage of the apparatus.

It has been found that in order to ensure a relatively constant voltage across the glow lamps 40 and 41, it is necessary for type NE-2 glow lamps that the current flow therethrough not be allowed to exceed 0.33 milliampere or become less than 0.15 milliampere. Because the current flow through the glow lamps 40 and 41 is partly determined by the magnitude of the output signal at the cathode 23 of tube 20, this, in effect, places a practical limitation on the range of input signals that the circuit configuration of Fig. 4 is capable of handling when using type NE-2 glow lamps. As a result, it has been found that the magnitude of the input signals for the Fig. 4 apparatus should be restricted to the range of ±54 volts. This limitation may be partially overcome, however, by using a different type of glow lamp which will permit a wider range of input signal variations. In any event, the basic signal-monitoring apparatus of Fig. 2 is not so limited and may be utilized where it is desired to monitor signals having amplitude variations greater than those which the Fig. 4 apparatus is capable of handling.

While applicant does not intent to limit the invention to any particular design constants, the following values have been found suitable for the apparatus of Fig. 4:

| | |
|---|---|
| Resistor 14 | 1.0 megohm. |
| Resistor 24 | 91,000 ohms. |
| Resistors 42, 43 | 600,000 ohms. |
| Neon lamps 40, 41 | Type NE-2. |
| Tubes 10, 20 | ½ 12AT7. |
| +B | +240 volts. |
| —B | —240 volts. |

From the foregoing description of the invention, it will be apparent that signal-monitoring apparatus constructed in accordance with the present invention represents new and novel apparatus using conventional electron tubes for monitoring electrical signals without causing any substantial loading on the signal source and with very little attenuation of the signal translated thereby.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for monitoring electrical signals with a minimum of loading on the signal source, the apparatus comprising: first and second cathode-follower stages coupled in cascade for translating the signal being monitored, the first stage including an electron-discharge device having an anode, a control electrode, and a cathode; a first circuit means for applying signal variations from an output terminal of the second stage to said anode for minimizing anode-to-cathode potential variations within the electron-discharge device of the first stage; a second circuit means for applying signal variations from the same output termnial of the second stage to said cathode for minimizing anode-to-cathode current flow variations within the electron-discharge device of the first stage; the output terminal of the second stage also serving as a terminal for supplying the translated signal to a utilization device.

2. Apparatus for monitoring electrical signals with a minimum of loading on the signal source, the apparatus comprising: a first electron-discharge device having an anode, a control electrode and a cathode, the control electrode constituting an input electrode for receiving the signals to be monitored; a first energy-supply circuit coupled between the anode and the cathode of the first electron-discharge device and including a load impedance and a source of unidirectional operating potential, the values of load impedance and operating potential being such as to cause the first electron-discharge device to operate with a minimum of control-electrode current to enable the device to translate the input signals with a minimum of loading on the signal source; a second electron-discharge device having an anode, a control electrode, and a cathode, the control electrode being coupled to the load impedance associated with the first electron-discharge device for enabling the second electron-discharge device to further translate the signals being monitored; a second energy-supply circuit coupled between the anode and the cathode of the second electron-discharge device and including a load impedance coupled to the cathode thereof; a first signal path coupled from the load impedance associated with the second electron-discharge device to the anode of the first electron-discharge device for minimizing anode-to-cathode potential variations within the first electron-discharge device; a second signal path coupled from the load impedance associated with the second electron-discharge device to the cathode of the first electron-discharge device for minimizing anode-to-cathode current flow variations within the first electron-discharge device; the action of the first and second signal paths being effective for maintaining said minimized control-electrode current in the first electron-discharge device regardless of the magnitude of the input signals being monitored; and output terminals coupled to the load impedance associated with the second electron-discharge device for supplying the signals being monitored to a utilization device.

3. Apparatus for monitoring electrical signals with a minimum of loading on the signal source, the apparatus comprising: a first electron-discharge device having an anode, a control electrode, and a cathode, the control electrode constituting an input electrode for receiving the signal to be monitored; a first energy-supply circuit coupled between the anode and the cathode of the first electron-discharge device and including a load impedance coupled to the cathode thereof and a sourec of unidirectional operating potential, the values of the load impedance and operating potential being such as to cause the first electron-discharge device to operate with a minimum of control-electrode current to enable the device to translate the input signals with a minimum of loading on the signal source; a second electron-discharge device having an anode, a control electrode, and a cathode, the control electrode being direct-current coupled to the cathode of the first electron-discharge device for enabling the second electron-discharge device to further translate the signal being monitored; a second energy-supply circuit coupled between the anode and the cathode of the second electron-discharge device and including a load impedance coupled to the cathode thereof; a first signal path coupled from the cathode of the second electron-discharge device to the anode of the first eletron-discharge device for minimizing anode-to-cathode potential variations within the first electron-discharge device; a second signal path coupled from the cathode of the second electron-discharge device through the load impedance associated with the first electron-discharge device to the cathode of the first electron-discharge device for minimizing anode-to-cathode current flow variations within the first electron-discharge device; the action of the first and second signal paths being effective for maintaining said minimized control-electrode current in the first electron-discharge device regardless of the magnitude of the input signal being monitored; and output terminals coupled to the load impedance associated with the second electron-discharge device for supplying the signal being monitored to a utilization device.

4. Apparatus for monitoring electrical signals with a minimum of loading on the signal source, the apparatus comprising: a first stage including an electron-discharge device having an anode, a control electrode, and a cathode, the control electrode constituting an input terminal for coupling to the signal source, and the stage including a load impedance and means for supplying an operating potential, the impedance and operating potential being proportioned to provide a quiescent operating point for the stage such that the anode-to-cathode current flow is at a minimum; a second stage for further translating the input signals; and circuit means for coupling signal variations from the second to the first stage for maintaining said minimized anode-to-cathode current flow regardless of the magnitude of the input signal being monitored, to enable the first stage to translate the input signals with a minimum of loading on the signal source.

5. Apparatus for monitoring electrical signals with a minimum of loading on the signal source, the apparatus comprising: a first cathode-follower stage including an electron-discharge device having an anode, a control electrode, and a cathode, the control electrode constituting an input terminal for coupling to the signal source, and the stage including a load impedance and means for supplying an operating potential, the impedance and operating potential being proportioned to provide a quiescent operating point for the stage such that the anode-to-cathode current flow is at a minimum; a second cathode-follower stage for further translating the input signals; and circuit means for coupling signal variations from the second to the first stage for maintaining said minimized anode-to-cathode current flow regardless of the magnitude of the input signal being monitored, to enable the first stage to translate the input signals with a minimum of loading on the signal source.

6. Apparatus for monitoring electrical signals with a minimum of loading on the signal source, the apparatus comprising: a first stage including an electron-discharge device having an anode, a control electrode, and a cathode, the control electrode constituting an input terminal for coupling to the signal source, and the stage including a load impedance and means for supplying an operating potential, the impedance and operating potential being proportioned to provide a quiescent operating point for the stage to develop less than 100 microamperes of anode current; a second stage for further translating the input signals; and circuit means for coupling signal variations from the second to the first stage for maintaining said minimized anode-to-cathode current flow regardless of the magnitude of the input signal being monitored, to enable the first stage to translate the input signals with a minimum of loading on the signal source.

7. Apparatus for monitoring electrical signals with a minimum of loading on the signal source, the apparatus comprising: a first stage including an electron-discharge device having an anode, a control electrode, and a cathode, the control electrode constituting an input terminal for coupling to the signal source, and the stage including a load impedance and means for supplying an operating potential, the impedance and operating potential being proportioned to provide a quiescent operating point for the stage such that the anode-to-cathode current flow is at a minimum; a second stage for further translating the input signals; and first and second signal paths for coupling signal variations from the second to the first stage for respectively minimizing potential variations and current flow variations between anode and cathode of the electron-discharge device, thereby to maintain said minimized anode-to-cathode current flow regardless of the magnitude of the input signal being monitored, to enable the first stage to translate the input signals with a minimum of loading on the signal source.

References Cited in the file of this patent

UNITED STATES PATENTS

| | | |
|---|---|---|
| 2,198,464 | Shepard | Apr. 23, 1940 |
| 2,441,334 | Sayer | May 11, 1948 |
| 2,462,190 | Hipple | Feb. 22, 1949 |
| 2,517,863 | Froman | Aug. 8, 1950 |
| 2,604,552 | White | July 22, 1952 |